(12) United States Patent
Miyakawa et al.

(10) Patent No.: US 6,217,807 B1
(45) Date of Patent: Apr. 17, 2001

(54) MOLDING FOR AUTOMOBILE AND ITS MANUFACTURING METHOD

(75) Inventors: Naohisa Miyakawa, Chiba; Katsuhisa Kato, Moriya-machi, both of (JP)

(73) Assignees: Tokiwa Chemical Industries, Co., Ltd, Chiba; System Technical Co., Ltd., Ibaragi, both of (JP)

( * ) Notice: Subject to any disclaimer, the term of this patent is extended or adjusted under 35 U.S.C. 154(b) by 0 days.

(21) Appl. No.: 09/260,052

(22) Filed: Mar. 2, 1999

(30) Foreign Application Priority Data

Mar. 13, 1998 (JP) .................................................. 10-106867
Oct. 21, 1998 (JP) .................................................. 10-336451

(51) Int. Cl.⁷ ..................................................... B32B 31/00
(52) U.S. Cl. ................................. 264/171.14; 264/171.23
(58) Field of Search ....................... 428/116; 264/171.1, 264/174.14, 171.23

(56) References Cited

FOREIGN PATENT DOCUMENTS 60-079926  *  5/1985  (JP) .
7-615142   * 12/1995  (JP) .

* cited by examiner

Primary Examiner—Francis J. Lorin
(74) Attorney, Agent, or Firm—Wenderoth, Lind & Ponack, L.L.P.

(57) ABSTRACT

A molding for automobile includes a molding body (1, 25) comprising a vertical supporting portion (2, 26) made of a synthetic resin, a decorative portion (3, 27) made from synthetic resin and integrally connected to the vertical supporting portion (2, 26), and a metal piece (5, 28) embedded in the vertical supporting portion (2, 26) and decorative portion (3, 27), wherein the metal piece (5, 28) is rigidly and integrally joined to the molding body (1, 25) via an adhesive resin layer (6, 29) of a polar group containing thermoplastic resin composition. A manufacturing method for the molding for an automobile comprises the steps of feeding a metal piece (5, 28) to a molding die (17, 21, 22), fusibly bonding an adhesive resin layer (6, 29) of a polar group containing thermoplastic resin composition to the metal piece (5, 28) in the molding die (17, 21), fusibly bonding a synthetic resin of the molding body (1, 25) to the adhesive resin layer (6, 29) laminated on and bonded to the metal piece (5, 28) in the molding die (17, 22), and forming a molding by integrally joining the metal piece (5, 28) to the molding body (1, 25) via the adhesive resin layer (6, 29).

25 Claims, 6 Drawing Sheets

MOLDING FOR AUTOMOBILE AND ITS MANUFACTURING METHOD

FIELD OF THE INVENTION

The present invention relates to a molding for an automobile and its manufacturing method. Particularly, the molding is a window molding, an outer molding, an inner molding, or a roof molding of weatherstrip to be mounted on vehicles like automobiles, wherein a metal piece is embedded in a molding body made of a synthetic resin and is joined rigidly and integrally to the synthetic resin of the molding body.

DESCRIPTION OF PRIOR ART

The known moldings of this kind which have an embedded metal piece are commonly formed so as to integrally join a molding body made of a polyvinyl chloride to the metal piece by using an adhesive to adhere the metal piece to the molding body.

In the known molding as described above, it is difficult to uniformly apply the adhesive onto the periphery of the metal piece, and it is required to set up a separate manufacturing line for performing a drying process to volatilize a solvent contained in the adhesive. Thus, the production efficiency is reduced considerably depending on the time required for the drying process, and an unpleasant odor caused by the volatilization of the adhesive solvent in the drying process results in a harmful environment in the manufacturing factory, and also results in air pollution. Thus, from an environmental perspective it is desirable that the adhesive with solvent be eliminated.

SUMMARY OF THE INVENTION

An object of the present invention is, in order to resolve the problems of the prior art as described above, to provide a molding for an automobile and its manufacturing method, wherein a metal piece to be embedded in a molding body made of a synthetic resin is joined integrally and rigidly to the molding body without using any adhesive containing a solvent. This is accomplished by employing a polar group containing thermoplastic resin composition that is capable of bonding efficiently to a metal while the resin is in a molten condition.

Another object of the present invention is to provide a molding for an automobile and its manufacturing method, wherein the molding body is made of an olefin based resin or a styrene based resin, which does not pollute the environment as does a dioxin or the like, and which contributes to lessening the automobile's weight because of its low specific gravity. The olefin based resin or styrene based resin is fusibly joined to a polar group containing thermoplastic resin composition that is fusibly bonded on the periphery of a metal piece.

Still another object of the present invention is to provide a molding for an automobile and its manufacturing method, wherein a polar group containing thermoplastic resin composition is fusibly bonded to the periphery of a metal piece except for a portion thereof, and a synthetic resin of the molding body is extruded onto the polar group containing thermoplastic resin composition bonded to the metal piece, whereby the metal piece is exposed along the longitudinal direction of the molding body and provides a decorative effect.

A molding for an automobile according to the present invention includes a molding body comprising a vertical support made of a synthetic resin, and a decorative section made of a synthetic resin formed integrally with the vertical support, along with a metal piece embedded in the vertical support and the decorative section, wherein the metal piece is joined integrally to the molding body by use of a polar group containing thermoplastic resin composition. The molding body according to the present invention includes a longitudinal aperture in the decorative section to outwardly expose the metal piece.

A manufacturing method for the molding for an automobile comprises the steps of: feeding continuously a metal piece to a molding die; fusibly bonding an adhesive resin layer of a polar group containing thermoplastic resin composition, which has been poured into a first extrusion molding machine, to the metal piece in the molding die; fusibly joining an olefin based resin or styrene based resin which has been poured into a second extrusion molding machine, to the adhesive resin layer laminated on and bonded to the metal piece; continuously forming a molding having the metal piece bonded integrally and rigidly to the olefin based resin or styrene based resin via the adhesive resin layer; feeding the molding by a transporting device into a cooling water pool to vulcanize or cure the resin; and cutting the molding to a given dimension by using a cutter. The adhesive layer of the polar group containing thermoplastic resin composition is bonded onto the metal piece, and the resin or the molding is joined to the adhesive layer such that a portion of the metal piece is outwardly exposed.

A modification of the manufacturing method for the molding for an automobile according to the present invention comprises the steps of: feeding a metal piece continuously to a first molding die and a second molding die; fusibly bonding a polar group containing thermoplastic resin composition, which has been poured into a first extrusion molding machine, to the metal piece in the first molding die; fusibly joining an olefin based resin or styrene based resin, which has been poured into a second extrusion molding machine, to the adhesive resin layer laminated on and bonded to the metal piece in the second molding die; continuously forming a molding having the metal piece joined integrally via the adhesive layer; feeding the molding into a cooling water pool by a transporting device to vulcanize or cure the resin; and cutting the molding to a given dimension by operating a cutter.

DETAILED DESCRIPTION OF THE PREFERRED EMBODIMENT

Figure 1:
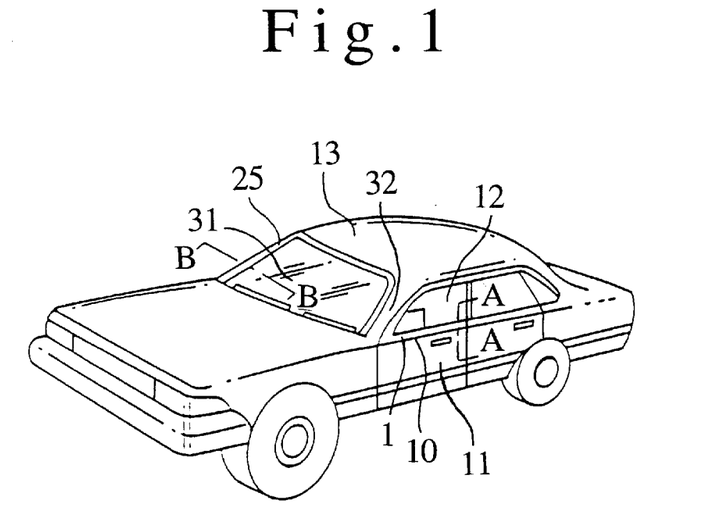
FIG. 1 is a perspective view of the vehicle mounted with the molding according to the present invention.

FIG. 1 shows a molding body 1 mounted on the upper end of a door panel 10 for guiding and supporting a window glass 12, which moves upwardly and downwardly in a door 11 of a vehicle like an automobile. Another molding body 25 is mounted between the outer circumference of a window glass 31 and a body panel 32.

Figure 2:
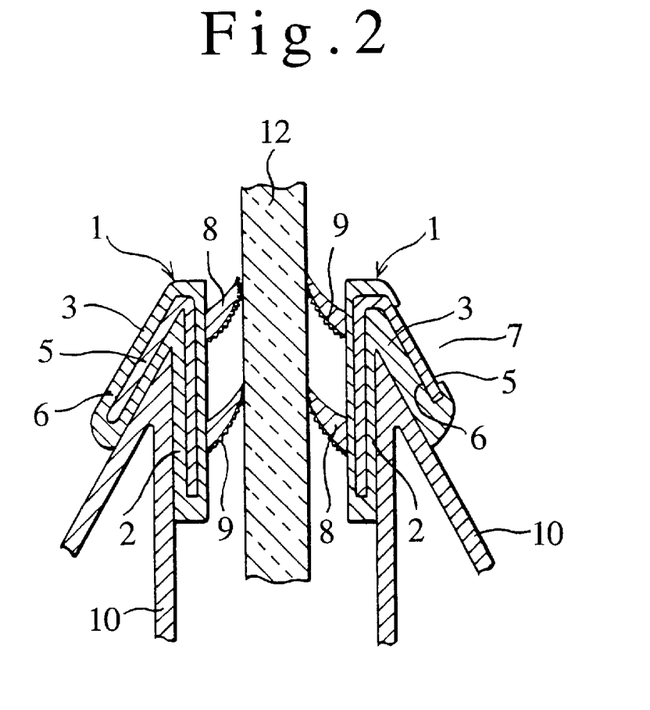
FIG. 2 is an enlarged sectional view taken along the line A—A of FIG. 1.

The molding body 1 is a molding body for the inner molding and the outer molding for a weatherstrip provided respectively on the inner side and outer side of the glass window 12 as shown in FIG. 2. Each molding body 1 includes a vertical supporting portion 2 made of a synthetic resin, a decorative portion 3 also made of a synthetic resin connected at an inclined angle relative to the vertical supporting portion, and a metal piece 5 embedded in both of the supporting portion 2 and the decorative portion 3. The metal piece 5 is joined integrally and rigidly to the molding body 1 made of synthetic resin via an adhesive resin layer 6 consisting of a polar group containing thermoplastic resin composition capable of bonding efficiently to metals in a molten condition.

Figure 3:
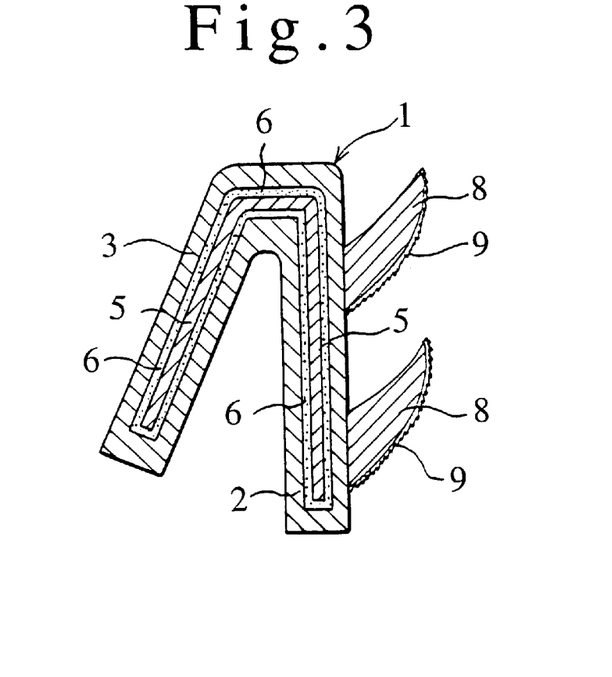
FIG. 3 is an enlarged sectional view of an inner molding according to the invention.

The molding body 1 of the inner molding for the weatherstrip as shown in FIG. 3 includes a vertical supporting portion 2 made of a synthetic resin which is located between the window glass 12 and the inner door panel 10, a decorative portion 3 made of a synthetic resin which is located on the interior side of the vehicle 13 far away from the window glass 12 and is connected at an inclined angle to the vertical supporting portion 2, and a metal piece 5 embedded inside the supporting portion 2 and decorative portion 3. The metal piece 5 is joined, integrally to the molding body made of the synthetic resin by fusibly bonding an adhesive resin layer, of a polar group containing thermoplastic resin composition capable of bonding efficiently to metal over the whole periphery of the metal piece 5.

The synthetic resin for the molding body 1 consists of an olefin based resin such as a polypropylene resin, an olefin based thermoplastic elastomer resin composition, a styrene based thermoplastic elastomer resin composition, etc. The metal piece 5 is stainless steel, iron, steel, aluminum, etc.

The polar group containing thermoplastic resin composition used for the adhesive resin layer 6 is an ethylene methacrylic acid copolymer or a metal salt thereof, compositions including an ethylene methacrylic acid copolymer or a metal salt thereof, a maleic anhydride, an acid denaturation of carboxylic acid, a denatured olefin based resin composition, or a denatured styrene based resin composition owing to epoxy denaturation.

Figure 4:
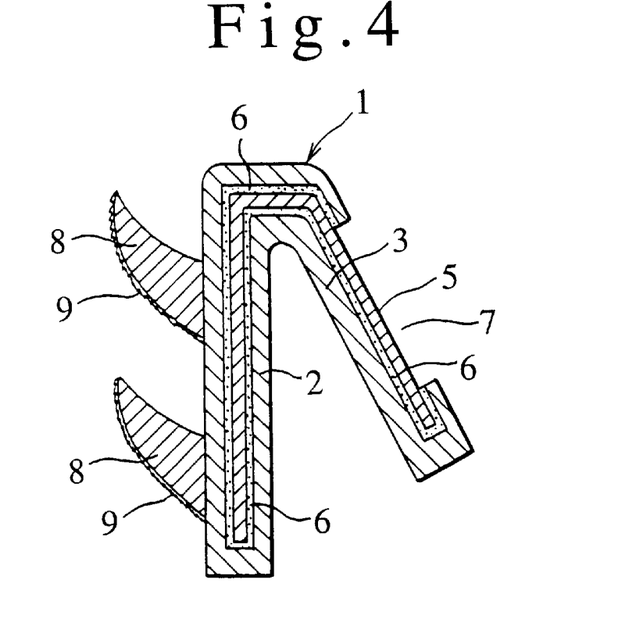
FIG. 4 is an enlarged sectional view of an outer molding according to the invention.

A draining foot 8 is mounted to the vertical supporting portion 2 of the molding body 1 to press against the glass window 12 as shown in FIG. 2 to FIG. 4. The draining foot 8 is made of a flexible olefin based thermoplastic elastomer composition or a flexible styrene based thermoplastic elastomer composition. The draining foot 8 is provided with a pressure laminate layer 9 in contact with the glass window 12. The pressure laminate layer 9 is made of a implanted flocculus or pile of nylon, etc., having low frictional resistance and excellent wear resistance, and a urethane coating, or a rough surface with a plurality of protrusions formed from a mixture of two sorts of polyethylene resins of different melting viscosities.

The molding body 1 of an outer molding for weatherstrip shown in FIG. 4 includes a vertical supporting portion 2 made of an olefin based resin or a styrene based resin which is located between the glass window 12 and the outer door panel 10, a decorative portion 3 made of an olefin based resin or a styrene based resin which is connected at an inclined angle relative to the vertical supporting portion 2 and is located outside of the outer door panel 10, and a metal piece 5 embedded in both of the vertical supporting portion 2 and decorative portion 3. The metal piece 5 is joined integrally to the synthetic resin of the molding body 1 via an adhesive resin layer 6 consisting of a polar group containing thermoplastic resin composition capable of bonding efficiently to metals. The decorative portion 3 of the molding body 1 is provided on its front surface with an aperture 7, through which the metal piece 5 is exposed and not covered with the adhesive resin layer 6 as well as the synthetic resin of the molding body 1, whereby a decorative effect is enhanced.

Figure 5:
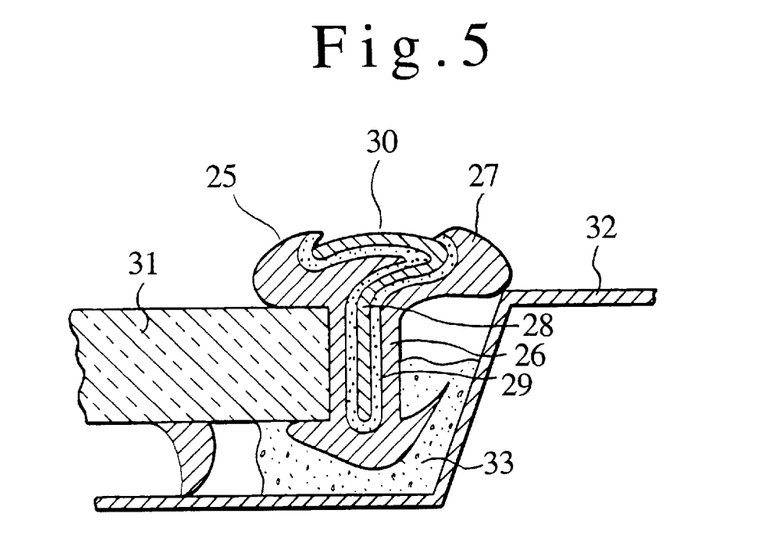
FIG. 5 is an enlarged sectional view taken along the line B—B of FIG. 1.

FIG. 5 shows a molding body 25 mounted between a window glass 31 and body panel 32 of an automobile, wherein the molding body 25 includes a vertical supporting portion 26 made of an olefin based resin or a styrene based resin, a decorative portion 27 made of an olefin based resin on a styrene based resin and connected vertically to the vertical supporting portion 26, and a metal piece 28 embedded in both of the supporting portion 26 and decorative portion 27 and integrally joined to the synthetic resin of the molding body 25 via an adhesive resin layer 29 of a polar group containing thermoplastic resin composition capable of bonding efficiently to metals. The decorative portion 27 of the molding body 25 is provided on its front surface with an aperture 30, through which the metal piece 28 is exposed and not covered with the adhesive resin layer 29 as well as the synthetic resin of the molding body 25, whereby a decorative effect is enhanced. The reference numeral 33 indicates an adhesive to seal the molding body 25 in a gap between the window glass 31 and the body panel 32.

Figure 6:
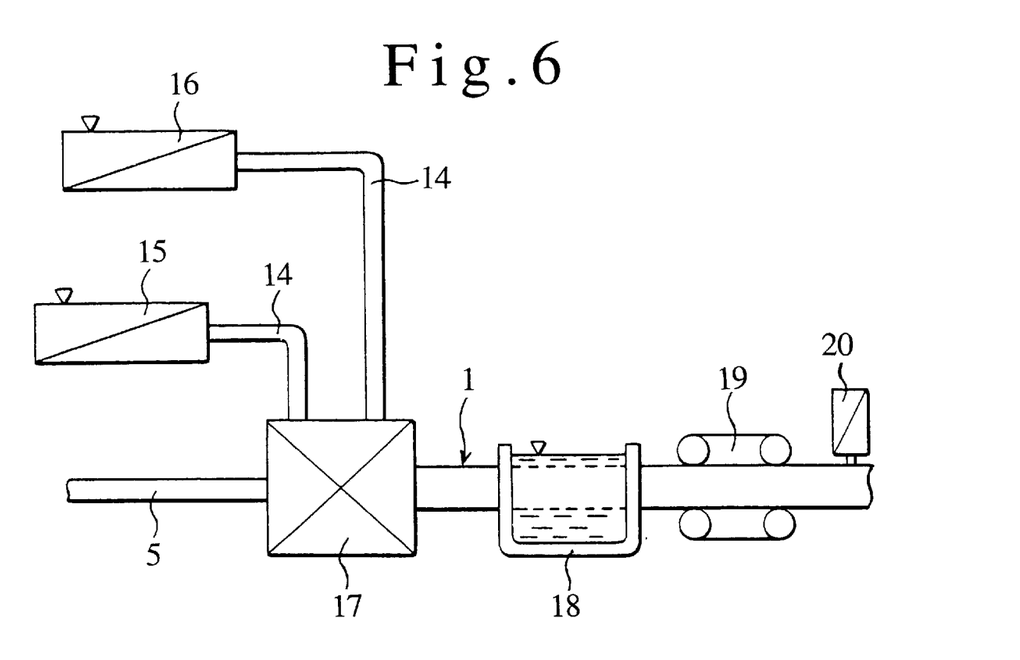
FIG. 6 is a front view of a manufacturing process for the molding according to the invention, wherein one molding die and two extrusion molding machines are used.

FIG. 6 shows a first embodiment of the manufacturing method of the molding according to the present invention. A first extrusion molding machine 15 is connected through a flow pipe 14 to a molding die 17. A second extrusion molding machine 16 is also connected through another flow pipe 14 to the molding die 17. An adhesive resin of a polar group containing thermoplastic resin composition is poured into and melted in the first extrusion molding machine 15, and similarly, an olefin based resin or a styrene based resin is poured into and melted in the second extrusion molding machine 16. When a metal piece 5 is fed continuously into the molding die 17, the melted adhesive resin poured into the first extrusion molding machine 15 is supplied through the flow pipe 14 to the molding die 17 and fuslsibly bonded to the periphery of the continuously fed metal piece 5 in the molding die 17. Then the melted olefin based resin or styrene based resin of the molding body poured into the second extrusion molding machine 16 is supplied through the flow pipe 14 to the molding die 17 and fisibly joined to the adhesive resin layer 6 laminated on and bonded to the periphery of the metal piece 5. Consequently, a molding is formed by integrally joining the metal piece via the adhesive resin layer to the molding body. Then, the molding is fed by transporting device 19 to a cooling water pool 18 to vulcanize or cure the molding, and is cut to a given dimension by a cutter 20 to form the desired molding. The molding die 17 is designed in such a manner that the melted adhesive resin layer and the melted synthetic resin of the molding body can be coated over the whole periphery of the metal piece 5, and can also be coated partially onto the periphery of the metal piece 5 so that an aperture 7 is formed in the molding body 1.

Figure 7:
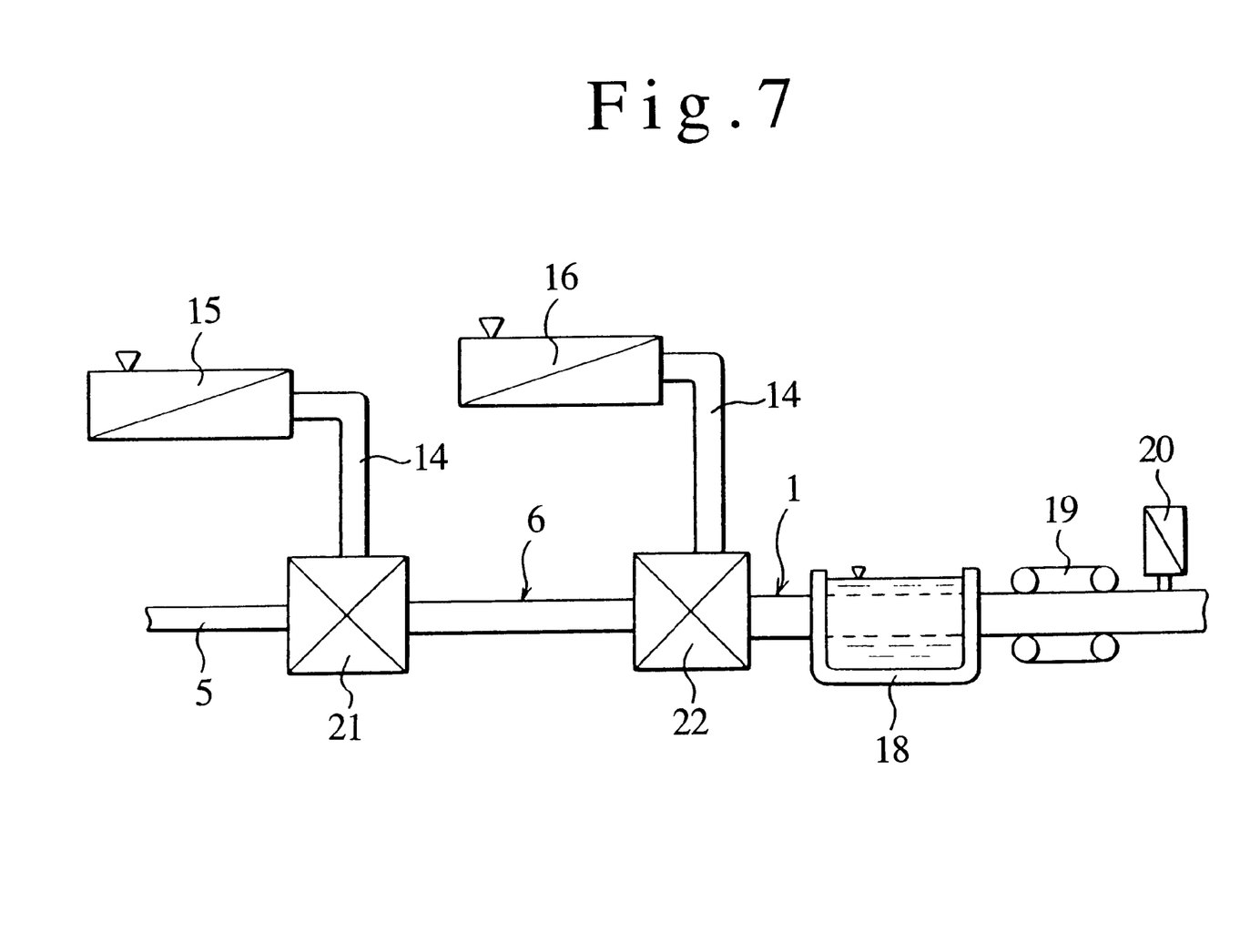
FIG. 7 is a front view of a manufacturing process for the molding according to the invention, wherein two molding dies and two extrusion molding machines are used.

FIG. 7 shows a second embodiment of the manufacturing process for the molding according to the present invention. A first extrusion molding machine 15 is connected through a flow pipe 14 to a first molding die 21, and a second extrusion molding machine 16 is connected through another flow pipe 14 to a second molding die 22. An adhesive resin of a polar group containing thermoplastic resin composition is poured into and melted in the first extrusion molding machine 15, and similarly an olefin based resin or styrene based resin of the molding body is poured into and melted in the second extrusion molding machine 16. Upon feeding a continuous metal piece 5 to the first molding die 21, the adhesive resin poured into the extrusion molding machine 15 is fed through the flow pipe 14 to the first molding die 21 and is fusibly bonded to the periphery of the metal piece 5 in the first molding die 21. Then the metal piece 5 laminated with the adhesive resin layer 6 is fed into the second molding die 22, and the olefin based resin or styrene based resin of the molding poured into the second extrusion molding machine 16 is fed through the flow pipe 14 to the second molding die 22 and is fusibly bonded to the adhesive resin layer 6 laminated on and bonded to the periphery of the metal piece 5. Consequently the synthetic resin of the molding body is integrally joined via the adhesive resin layer 6 to the metal piece 5 to form a continuous molding. The continuous molding is then fed by a transporting device 19 to a cooling water pool 18 to vulcanize or cure the molding, and is cut by a cutter 20 to a given dimension to form a molding. The first molding die 21 is designed such that the melted adhesive resin can be coated over the whole or a portion of the periphery of the metal piece 5, and the second molding die 22 is likewise designed so that the melted synthetic resin of the molding body can be coated over the whole or a portion of the periphery of the adhesive resin layer 6 laminated on and bonded to the metal piece 5.

Figure 8:
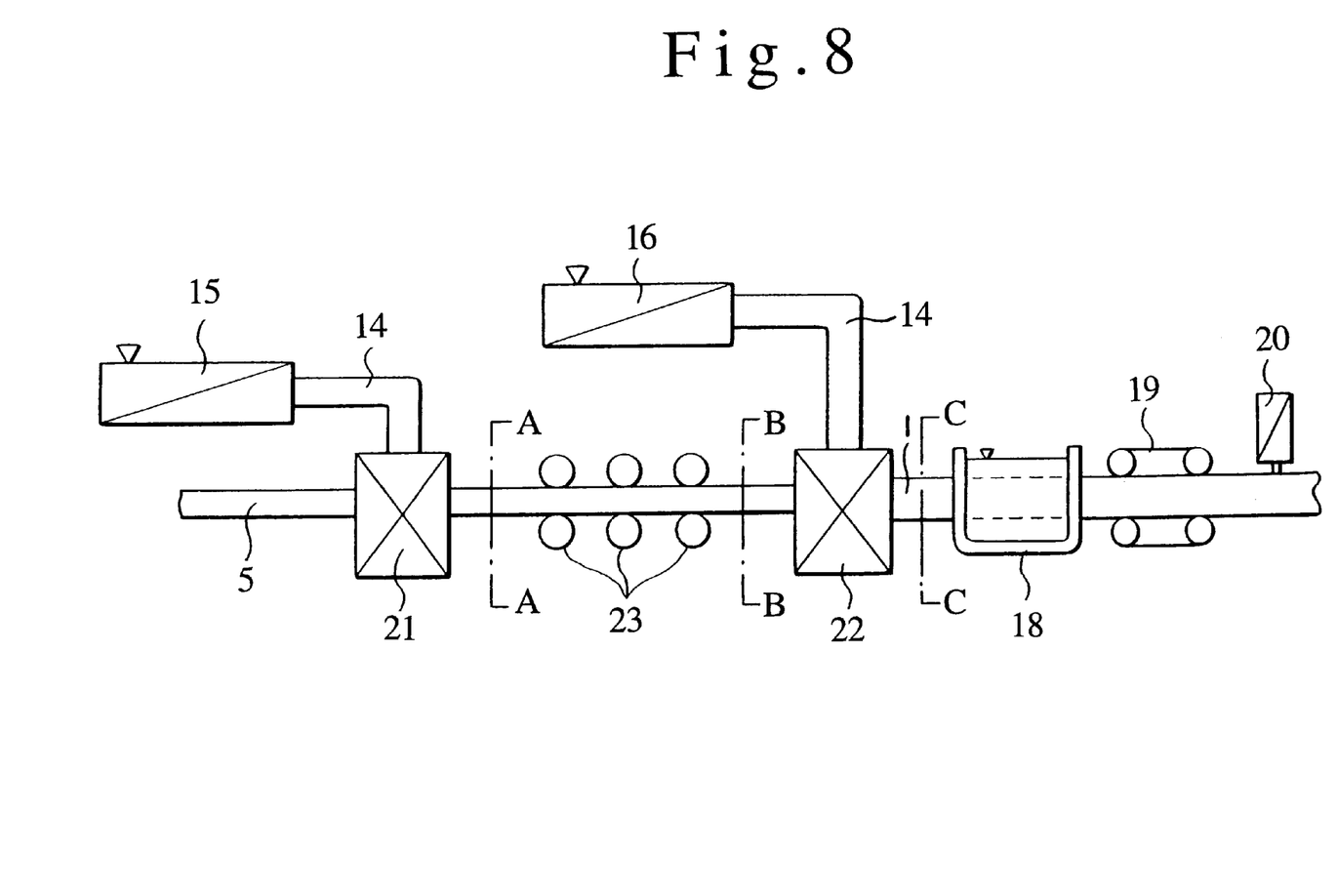
FIG. 8 is a front view of a manufacturing method for the molding according to the invention, wherein a roll forming device is interposed between the two molding dies of FIG. 7; and, FIGS. 9(a)–9(c) show an enlarged sectional view of the molding sequence for the molding manufactured according to the manufacturing process of FIG. 7.

FIG. 8 shows a modification of the manufacturing process for the molding shown in FIG. 7. In this modification, a roll forming device 23 is disposed between the first molding die 21 and the second molding die 22 to form a bending portion 24 on the metal piece 5 laminated with the adhesive resin layer 6.

In the manufacturing process for the molding shown in FIG. 6 and FIG. 7, the roll forming device 23 can be disposed upstream of the molding die 17 and the first molding die 21 to form the bending portion 24 on the metal piece 5 before the metal piece 5 is fed to the molding die 17 and the first molding die 21.

Figures 9, 9A, 9B, 9C:
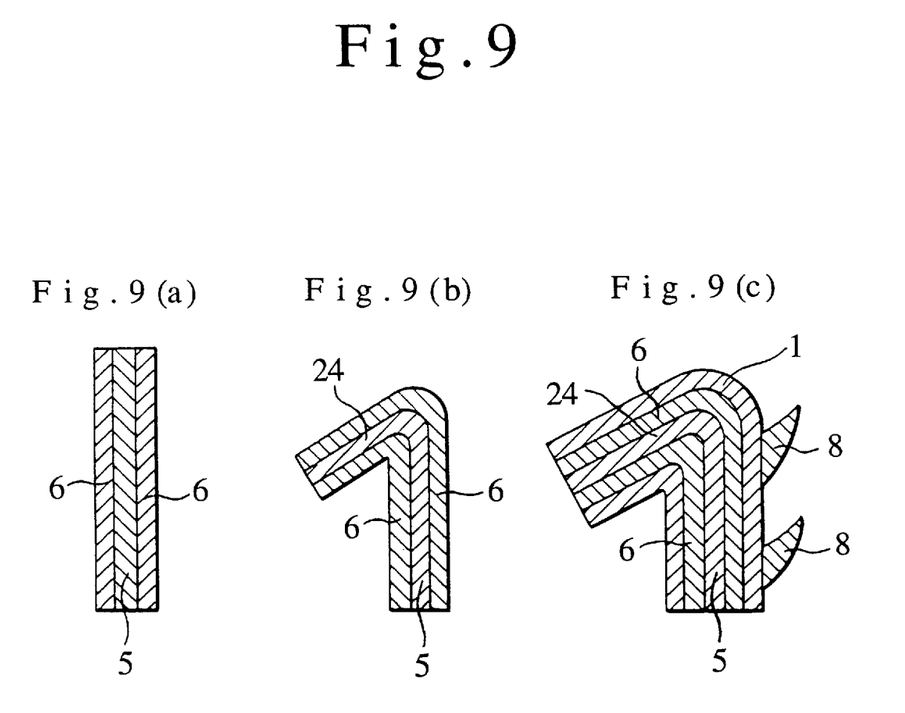

FIGS. 9(*a*)–9(*c*) show a processing sequence for products in the manufacturing process for the molding, wherein FIG. 9 (*a*) shows a condition in which the adhesive resin layer 6 is fusibly bonded on the periphery of the metal piece 5, FIG. 9 (*b*) shows a condition in which a bending portion 24 is formed on the metal piece 5 laminated with the adhesive resin layer 6 by the roll forming device 23, and FIG. 9 (*c*) shows a condition in which the synthetic resin of the molding body is fusibly joined to the periphery of the adhesive resin layer 6 laminated on the metal piece 5.

In the manufacturing method for the molding according to the present invention, the polar group containing thermoplastic resin composition of the adhesive resin layer 6 poured into the first extrusion machine 15 is heated at a temperature of 150 to 240° C., and the olefin based resin or the styrene based resin poured into the second extrusion molding machine 16 is heated at a temperature of 160 to 240° C. The molding can be formed in one molding die 17, or two molding dies 21, 22 by operating the two molding dies simultaneously.

In the molding for an automobile and its manufacturing method according to this invention, the metal piece can be rigidly and integrally joined to the synthetic resin of the molding body by using the adhesive resin of the polar group containing thermoplastic resin composition without causing any harmful environment in the manufacturing factory, and without causing any atmospheric pollution The use of the olefin based resin or styrene based resin for the molding body can serve for lessening an automobile's weight, and allows for simple enhancement of a decorative effect of the molding.

What is claimed is:

1. A method for manufacturing a molding, comprising:
   depositing a polar group containing thermoplastic resin adhesive onto a member, whereby said polar group containing thermoplastic resin adhesive becomes bonded to said member; and
   depositing a synthetic resin onto said polar group containing thermoplastic resin adhesive, whereby said synthetic resin becomes bonded to said polar group containing thermoplastic resin adhesive.

2. The method according to claim 1, wherein the depositing of a polar group containing thermoplastic resin adhesive includes depositing a polar group containing thermoplastic resin adhesive selected from the group consisting of an ethylene methacrylic acid copolymer, a metal salt of an ethylene methacrylic acid copolymer, a maleic anhydride, an acid denaturation of carboxylic acid, a denatured olefin based resin composition owing to epoxy denaturation, and a denatured styrene based resin composition owing to epoxy denaturation.

3. The method according to claim 2, wherein the depositing of a synthetic resin includes depositing a synthetic resin selected from the group consisting of a polypropylene resin, an olefin based thermoplastic elastomer resin, and a styrene based thermoplastic elastomer resin.

4. The method according to claim 3, wherein the depositing of a polar group containing thermoplastic resin adhesive onto a member includes depositing a polar group containing thermoplastic resin adhesive onto a metal member.

5. The method according to claim 4, wherein the depositing of a polar group containing thermoplastic resin adhesive onto a metal member includes depositing a polar group containing thermoplastic resin adhesive onto a metal member selected from the group consisting of stainless steel, iron, steel and aluminum.

6. The method according to claim 2, wherein the depositing of a polar group containing thermoplastic resin adhesive onto a member includes depositing a polar group containing thermoplastic resin adhesive onto a metal member.

7. The method according to claim 6, wherein the depositing of a polar group containing thermoplastic resin adhesive onto a metal member includes depositing a polar group containing thermoplastic resin adhesive onto a metal member selected from the group consisting of stainless steel, iron, steel and aluminum.

8. The method according to claim 1, wherein the depositing of a synthetic resin includes depositing a synthetic resin selected from the group consisting of a polypropylene resin, an olefin based thermoplastic elastomer resin, and a styrene based thermoplastic elastomer resin.

9. The method according to claim 8, wherein the depositing of a polar group containing thermoplastic resin adhesive onto a member includes depositing a polar group containing thermoplastic resin adhesive onto a metal member.

10. The method according to claim 9, wherein the depositing of a polar group containing thermoplastic resin adhesive onto a metal member includes depositing a polar group containing thermoplastic resin adhesive onto a metal member selected from the group consisting of stainless steel, iron, steel and aluminum.

11. The method according to claim 1, wherein the depositing of a polar group containing thermoplastic resin adhesive onto a member includes depositing a polar group containing thermoplastic resin adhesive onto a metal member.

12. The method according to claim 11, wherein the depositing of a polar group containing thermoplastic resin adhesive onto a metal member includes depositing a polar group containing thermoplastic resin adhesive onto a metal member selected from the group consisting of stainless steel, iron, steel and aluminum.

13. The method according to claim 1, wherein the depositing of a polar group containing thermoplastic resin adhesive onto a member includes:
    feeding a metal member to a molding die; and
    supplying a polar group containing thermoplastic resin adhesive from a first extrusion molding machine onto said metal member at said molding die;
    and wherein the depositing of a synthetic resin onto said polar group containing thermoplastic resin adhesive includes:
        supplying a synthetic resin from a second extrusion molding machine onto said polar group containing thermoplastic resin adhesive while said metal member is at said molding die.

14. The method according to claim 13, and further comprising:
    transporting said metal member with said polar group containing thermoplastic resin adhesive and said synthetic resin thereon into water, thereby cooling said polar group containing thermoplastic resin adhesive and said synthetic resin, whereby said polar group containing thermoplastic resin adhesive and said synthetic resin cures such that said polar group containing thermoplastic resin adhesive bonds said metal member to said synthetic resin.

15. The method according to claim 14, and further comprising cutting to length the member with said polar group containing thermoplastic resin adhesive and said synthetic resin thereon.

16. The method according to claim 15, wherein the depositing of a polar group containing thermoplastic resin adhesive onto the metal member includes partially covering the metal member with the polar group containing thermoplastic resin adhesive such that a portion of the metal member is exposed, and the depositing of a synthetic resin onto said polar group containing thermoplastic resin adhesive includes not depositing the synthetic resin onto the exposed portion of the metal member, such that an aperture is defined by the polar group containing thermoplastic resin adhesive and the synthetic resin, through which aperture the metal member is exposed.

17. The method according to claim 16, wherein the depositing of a polar group containing thermoplastic resin adhesive includes depositing a polar group containing thermoplastic resin adhesive selected from the group consisting of an ethylene methacrylic acid copolymer, a metal salt of an ethylene methacrylic acid copolymer, a maleic anhydride, an acid denaturation of carboxylic acid, a denatured olefin based resin composition owing to epoxy denaturation, and a denatured styrene based resin composition owing to epoxy denaturation.

18. The method according to claim 15, wherein the depositing of a polar group containing thermoplastic resin adhesive includes depositing a polar group containing thermoplastic resin adhesive selected from the group consisting of an ethylene methacrylic acid copolymer, a metal salt of an ethylene methacrylic acid copolymer, a maleic anhydride, an acid denaturation of carboxylic acid, a denatured olefin based resin composition owing to epoxy denaturation, and a denatured styrene based resin composition owing to epoxy denaturation.

19. The method according to claim 1, wherein the depositing of a polar group containing thermoplastic resin adhesive onto a member includes:
    feeding a metal member to a first molding die; and
    supplying a polar group containing thermoplastic resin adhesive from a first extrusion molding machine onto said metal member at said first molding die;
    and wherein the depositing of a synthetic resin onto said polar group containing thermoplastic resin adhesive includes:
        feeding said metal member with said polar group containing thermoplastic resin thereon to a second molding die; and
        supplying a synthetic resin from a second extrusion molding machine onto said polar group containing thermoplastic resin adhesive while said metal member is at said second molding die.

20. The method according to claim 19, and further comprising:
    transporting said metal member with said polar group containing thermoplastic resin adhesive and said synthetic resin thereon into water, thereby cooling said polar group containing thermoplastic resin adhesive and said synthetic resin, whereby said polar group containing thermoplastic resin adhesive and said synthetic resin cure such that said polar group containing thermoplastic resin adhesive bonds said metal member to said synthetic resin.

21. The method according to claim 20, and further comprising cutting to length the member with said polar group containing thermoplastic resin adhesive and said synthetic resin thereon.

22. The method according to claim 21, wherein the depositing of a polar group containing thermoplastic resin adhesive onto the metal member includes partially covering the metal member with the polar group containing thermoplastic resin adhesive such that a portion of the metal member is exposed, and the depositing of a synthetic resin onto said polar group containing thermoplastic resin adhesive includes not depositing the synthetic resin onto the exposed portion of the metal member, such that an aperture is defined by the polar group containing thermoplastic resin adhesive and the synthetic resin, through which aperture the metal member is exposed.

23. The method according to claim 22, wherein the depositing of a polar group containing thermoplastic resin adhesive includes depositing a polar group containing thermoplastic resin adhesive selected from the group consisting of an ethylene methacrylic acid copolymer, a metal salt of an ethylene methacrylic acid copolymer, a maleic anhydride, an acid denaturation of carboxylic acid, a denatured olefin based resin composition owing to epoxy denaturation, and a denatured styrene based resin composition owing to epoxy denaturation.

24. The method according to claim 23, wherein the depositing of a polar group containing thermoplastic resin adhesive includes depositing a polar group containing thermoplastic resin adhesive selected from the group consisting of an ethylene methacrylic acid copolymer, a metal salt of an ethylene methacrylic acid copolymer, a maleic anhydride, an acid denaturation of carboxylic acid, a denatured olefin based resin composition owing to epoxy denaturation, and a denatured styrene based resin composition owing to epoxy denaturation.

25. The method according to claim 19, and further comprising shaping said metal member at a location upstream of said second molding die.

\* \* \* \* \*